United States Patent [19]

Heidman, Jr.

[11] Patent Number: 5,109,214
[45] Date of Patent: Apr. 28, 1992

[54] VEHICLE DIRECTIONAL SIGNAL SWITCH WITH LANE CHANGING POSITION INTERCONNECTING TO FLASHING LAMPS ON LEFT AND RIGHT SIDE REAR VIEW MIRRORS AND FLASHING BRAKE LAMPS IN REVERSE

[76] Inventor: William A. Heidman, Jr., 4604 Robbins, San Diego, Calif. 92122

[21] Appl. No.: 484,477

[22] Filed: Feb. 23, 1990

Related U.S. Application Data

[63] Continuation of Ser. No. 283,725, Dec. 13, 1988, abandoned, which is a continuation-in-part of Ser. No. 452,879, Dec. 27, 1982, abandoned, which is a continuation-in-part of Ser. No. 387,457, Jun. 11, 1982, Pat. No. 4,638,296, which is a continuation-in-part of Ser. No. 194,230, Nov. 6, 1950, Pat. No. 2,766,343.

[51] Int. Cl.$^5$ .............................................. B60Q 1/34
[52] U.S. Cl. ................................ 340/475; 307/10.8; 340/463; 340/479; 362/83.1
[58] Field of Search ....................... 340/463–465, 340/468, 471, 472, 475, 479; 362/83.1, 61; 307/10.8

[56] References Cited

U.S. PATENT DOCUMENTS

| | | | |
|---|---|---|---|
| 2,238,394 | 4/1941 | Murray, Jr. | 340/78 |
| 2,511,971 | 6/1950 | Dalton | 340/98 |
| 2,600,751 | 6/1952 | Gazda | 362/83.1 |
| 3,742,480 | 6/1973 | Hoecker | 340/568 |
| 4,274,078 | 6/1981 | Isobe et al. | 362/83.1 |
| 4,475,100 | 10/1984 | Duh | 362/83.1 |
| 4,583,155 | 4/1986 | Hart | 362/83.1 |
| 4,661,800 | 4/1987 | Yamazaki | 362/83.1 |

FOREIGN PATENT DOCUMENTS 1210061 10/1970 United Kingdom .............. 340/98

OTHER PUBLICATIONS

Anonymous, 'Vehicle Backup Warning System', Apr. 1978, No. 168, Research Disclosure.

*Primary Examiner*—Jin F. Ng
*Assistant Examiner*—Brent A. Swarthout
*Attorney, Agent, or Firm*—Frank D. Gilliam

[57] ABSTRACT

This invention is additional safety for vehicles passing in multiple traffic lanes to indicate passing of another vehicle is anticipated or intended or that change over to an inner or outer lane of multiple lane road is to be made. In heavy traffic, a passing driver may not see the rear turn signal lamp when an initial overlap occurs. On each side of the vehicle, the rear view mirrors attached to the front doors, are mounted flashing lane changing signal lamps which are readily visible to the passing driver, however, do not interfere in any way to the vision of the driver or passengers. For further safety in alerting others, these lamps also will flash in unison with brake lamps when vehicle is backing. In addition, third and fourth self contained thermostatic lamps also can be incorporated as a separate auxiliary hazard using minute drain on battery for long term signaling.

5 Claims, 1 Drawing Sheet

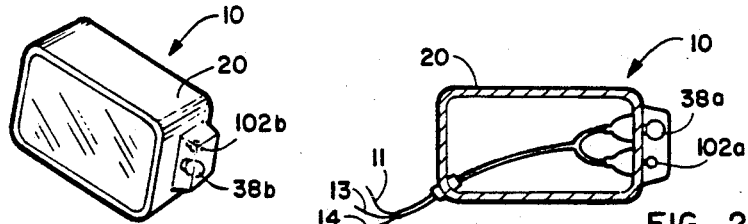
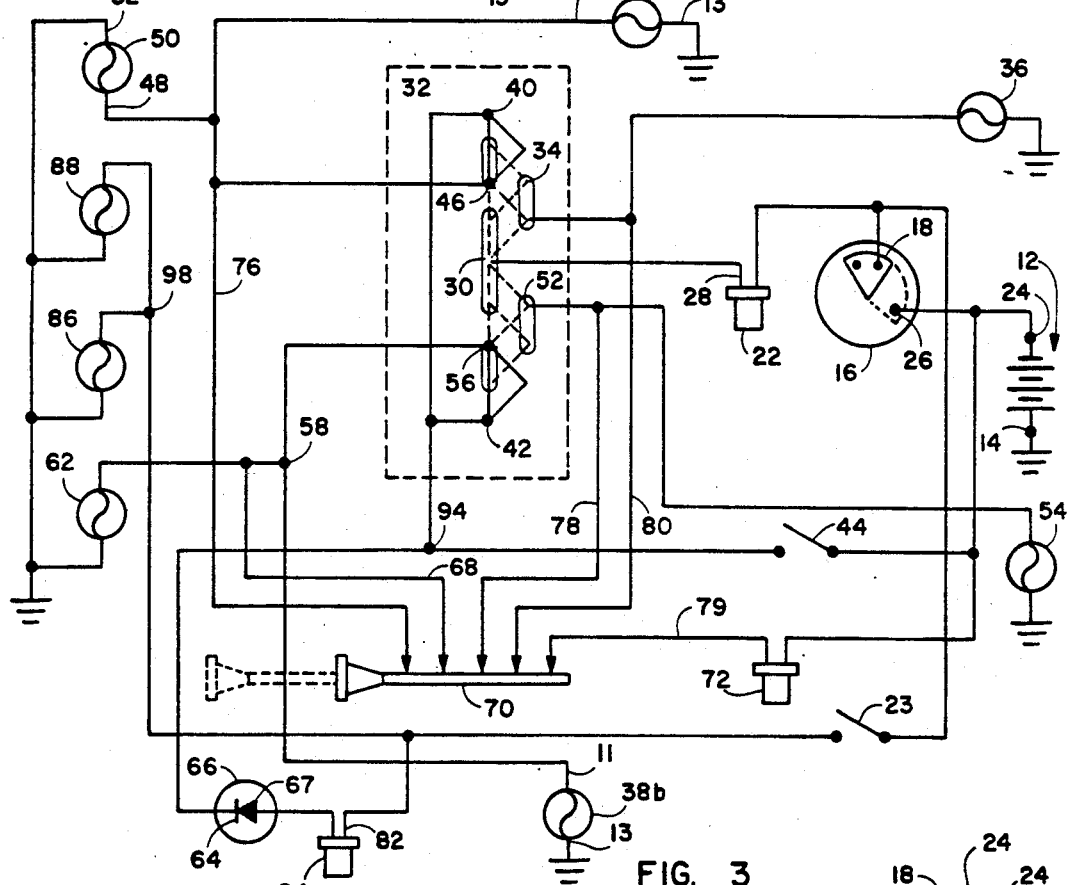
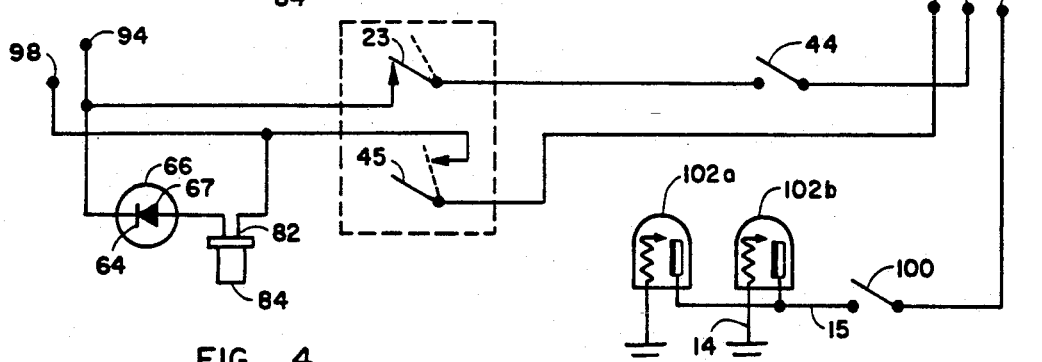

VEHICLE DIRECTIONAL SIGNAL SWITCH WITH LANE CHANGING POSITION INTERCONNECTING TO FLASHING LAMPS ON LEFT AND RIGHT SIDE REAR VIEW MIRRORS AND FLASHING BRAKE LAMPS IN REVERSE

This application is a continuation of Ser. No. 283,725, now abandoned, which is a continuation-in-part of my pending patent application Ser. No. 452,879, now abandoned, entitled Vehicle Directional and Backup Indicator which is a continuation-in-part of Ser. No. 387,457, now U.S. Pat. No. 4,638,296 titled Directional Signal Switch and Alternating Lighting of Rear Lamps and a continuation-in-part of Ser. No. 194,230, now U.S. Pat. No. 2,766,343, now expired.

BACKGROUND OF THE INVENTION

This invention relates to improvements in automotive lane changing signal and flashing brake lamps when vehicle is backing and more particularly to visual signal perception and motor vehicle lighting associated therewith.

Lane changing signal lights on the front and rear of motor vehicles are well known. These generally take the form of flashing turn signal lamps on front of the automotive vehicle and on the rear thereof. The lane changing position is incorporated in the turn signal switch.

Examples of prior art automobile vehicle turn, lane changing, hazard and brake circuits means are generally shown in my prior U.S. Pat. Nos. 3,372,374; 3,372,373; 3,263,211; 4,480,249; 4,575,706 and particularly 2,766,343.

SUMMARY OF THE INVENTION

Briefly, the conventional rear brake lights, turn signal lights and front turn signal lights of an automotive vehicle are utilized to increase the awareness of drivers of automobiles when a nearby automotive vehicle is planning to turn from its current path of travel; However, when an automotive vehicle is adjacent to a second automotive vehicle planning a lane change the driver of the approaching vehicle cannot see the conventional rear or front turn signals of the lane changing automotive vehicle. It should be obvious that when automotive vehicles traveling in adjacent lanes of travel are in certain relative positions to one another one or both of the drivers of those automotive vehicles cannot see either the front or rear turn signals on the adjacent automotive vehicle. To overcome this operator blind spot problem, a flashing lane changing lamp is positioned on the outer surface of a housing encompassing a side view mirror positioned on each side of the automotive vehicle. These mirror lane changing signaling lamps are located so as to provide 180° visual indication to operators of oncoming automotive vehicles on each side of the automotive vehicles window frame on which they are mounted. With flashing lane changing lamps so located, drivers of approaching or passing adjacent automotive vehicles can clearly see the intentions of the operator of the adjacent automotive vehicle including elevated drivers in truck cabs who cannot see rear lamps of small vehicles in front when in close proximity. These mirror mounted flashing lane changing lamps are essential to driving safety especially when the operator of the vehicle intending a lane change is unaware of the approaching automotive vehicle, for instance, when that approaching automotive vehicle is in a blind spot to his normal vision.

This invention additionally provides a circuit interconnected to the normal automotive vehicle back up light circuit which causes combined rear turn signal or brake lamps and outside rear view mirror mounted lamps to illuminate or flash on and off and the back up conventional positioned lamps to illuminate steady state when the ignition switch and the vehicle drive system is placed in a vehicle reverse mode. The steady bright illumination of back up lamps clearly indicate that the vehicle is backing.

A diode or relay is positioned between the normal back up circuit and brake light circuits to prevent the back up lamps from illuminating when brake, turn signal or hazard warning circuits are engaged.

An object of this invention is to provide visual indicators on the sides of an automotive vehicle which are readily visible to the operator of an approaching automotive vehicle to warn that operator of lane change intentions of the forward automotive vehicle.

Still another object of this invention is to provide flashing brake lamps to an automotive vehicle when in a reverse operating mode.

Still a further object of this invention is to provide third and fourth flasher lamps which are self contained thermostatic operated bulbs used only as an auxiliary hazard system, when, for example, a driver leaves his vehicle along side the road for long term emergency signaling.

These and other objects of this invention will become apparent from the following description taken together with the accompanying drawings.

BRIEF DESCRIPTION OF THE DRAWINGS

FIG. 1 is a perspective of an automotive vehicle side mount rear view mirror with a positioned lane change signal lamp and auxiliary hazard lamp mounted thereon;

FIG. 2 is a cutaway of the right side mounted rear view mirror of FIG. 1 showing the structure and electrical connection and socket for the outer lamp and cover lens of the rear view lane change signal lamp and the auxiliary hazard lamp.

FIG. 3 is a schematic wiring diagram of the invention including a third flasher and a diode for flashing brake lamps as a back up warning signal.

FIG. 4 is a schematic wiring diagram showing a second embodiment of FIG. 3; and

FIG. 5 is a schematic wiring diagram showing thermal operated flashing lamps as an auxiliary hazard system as shown in FIG. 1 and FIG. 2.

DETAILED DESCRIPTION OF THE DRAWINGS

Throughout the Figures and description the same reference numerals are used to identify the same or similar elements.

Referring to the drawing Figures in detail and in particular to drawing FIGS. 1 and 2, the reference character 10 generally designates an external automotive vehicle right side rear view mirror. Many automotive vehicles today include a mirror of this type mounted on the left and right side of the vehicle generally in the vicinity of the forward upper portion of the front vehicle doors. Located on the right side of the vehicle on the outer surface of the mirror housing in FIG. 1 is lane changing lamp 38b and an auxiliary hazard lamp 102b. Corresponding lamps on the left side of the vehicle are designated as 38a and 102a (See circuit in FIG. 5). Thus, FIG. 1 represents a right hand side and FIG. 2 shows a cutaway section of the completely enclosed type rear view mirror and interior built in sockets and wiring. The left hand (driver's side) is constructed the same except in reverse. It should be understood that the lamp 38 or lamp 102 on both left and right sides face outwardly out of the vision of driver and passenger. These lamps 38 and 102 are illuminated by applying voltage through electrical wires 11 and 13 and 14 and 25 respectfully, as shown in FIGS. 3 and 5. These wires 11, 13, 14 and 15 are located within the mirror housing 20 and pass into the automobile through an opening adjacent its attachment means (not shown).

Referring now specifically to FIG. 3, a battery 12 has its negative terminal 14 connected to ground and to an ignition switch 16 of the single throw single pole four position rotatable with a rotatable start position key operated variety well known in the art. Terminal 18 of the switch 16 is connected to one terminal of a conventional automotive signal flasher 22 well known in this art and to back up light switch 23. The positive battery terminal 24 is connected to contact 26 of switch 16. Terminal 28 of the signal flasher 22 is connected to the terminal 30 of a double pole double throw turn signal switch 32. Incorporated in this turn signal switch is a lane changing position, which is held "resiliently" by driver.

The turn signal switch 32 is shown in its neutral or inactivated position. Terminal 34 of the turn signal switch 32 is connected to the vehicle front turning signal lamp 36 and to mirror mounted lamp 38a. Lamps 36 and 50 are generally about thirty two candle power while lamps 38a and 38b are generally about two candle power. The other side of these lamp elements are connected to ground (battery negative) to complete their circuit. Terminals 40 and 42 of the turn signal switch 32 are connected to the brake light activator switch 44. The opposite side of the switch is connected to the positive pole 24 of battery 12.

Terminal 46 of the turn signal switch 32 is connected to connection 48 which is one side of the filament of combination turn signal and brake lamp 50. Lamp 50 is positioned as a conventional rear turn signal lamp which is commonly found on each side of the rear portion of modern automotive vehicles. The opposite end 5 of the filament of lamp 50 is connected to battery ground or negative potential.

The opposite half of the turn signal switch 32 is wired in a similar manner as discussed above to similar turn signal lights on the opposite side of the automotive vehicle. Terminal 52 of the turn signal switch 32 is connected to one side of the filament of the front turn signal lamp 54. The opposite end of the filament of lamp 54 is connected to ground potential (battery negative). Terminal 94 is connected to 40 and 42 of the turn signal switch brake lamp circuit, the cathode 64 of diode 66 to the flasher 84 to back up lamps 86 and 88.

Switch 32 is a steering column mounted switch which is common to modern automotive vehicles and is more specifically described as a turn signal switch in my U.S. Pat. Nos. 3,372,374, 4,354,174 and 4,638,296.

The hazard warning switch 70, when in its closed position, as shown, interconnects the positive pole 24 of the battery 12 through a conventional hazard flasher element 72. The hazard switch over-rides the turn signal switch and hence the turn signal switch and lamps actuated therefrom are inoperable when the hazard system is activated. The hazard warning switch 70 is connected through lines 76, 68, 78 and 80 to brake lamps 50 and 62 to the flasher 72 and to terminals 52 and 34 respectfully of turn signal switch 32. The phantom lines in the drawing of the hazard switch 70 indicate the open or inactivated position with the voltage from the battery removed and the system inoperable.

The opposite connection of back up light switch 23 is connected to terminal 82 of a third flasher 84 and to diode 66 and one side of the filament of brake lamps 50 and 62. The opposite side of the filaments of brake lamps 50 and 62 are connected to ground potential.

In operation, the circuit of FIG. 3 is activated by rotating ignition switch 16 to a closed position in which the two portions are ganged together. With lane changing turn signal switch 32 in the left lane changing signal position, the flasher 22 draws current, momentarily completing connection between the battery and the common connection 30 of the lane changing turn signal switch 32. With the flasher switch momentarily closed, battery voltage is applied to the common filaments of the lamps 36, 38a and 50 through terminals 30, 34, and 46 of the lane changing, turn signal switch 32. The battery voltage causes the filament of lamps 36, 38a and 50 to illuminate. When the voltage is removed from the lamps 36, 38a and 50 causing them to extinguish. This sequence repeats itself until the lane changing turn signal switch 32 is returned to neutral or right lane changing signal position.

The opposite lane changing side of the circuit of FIG. 3 operates in the same manner as described above. Terminals 30, 52, and 56 of the lane changing turn signal switch 32 are common when the switch 32 is operated for signaling a lane change in the opposite direction (right). When the flasher 22 is momentarily closed voltage is supplied to lamps 38b, 54 and 62 illuminating these lamps. When the flasher 22 is in an open condition, the lamps noted are again extinguished. This sequence repeats itself until the lane changing turn signal switch 32 is returned either to its neutral or left lane changing signal position.

When the back up switch 23 is closed, voltage is supplied to terminals 82 of a third flasher 84 and to backup lamps 86 and 88. The voltage applied to lamps 86 and 88 cause these lamps to illuminate at a constant state. The momentary closing of flasher 84 applies voltage to the anode 67 of diode 66 causing lamps 38a, 38b, 50 and 62 to illuminate. The opening of flasher 84 causes the last mentioned lamps to extinguish. It should be understood that when the backup lights are illuminated at a constant state that lamps 38a, 38b, 50 and 62 flash on and off together, thereby indicating a back up warning signal. The diode 66 allows current to flow in only one direction thus preventing the back up lamps from illuminating when the brake lamps are illuminated by brake switch 44 or the turn signal switch 32 or the hazard switch 70 is operated.

FIG. 4 is a schematic wiring diagram wherein the reverse switches 45 provide flashing brake lamps, even though the brake switch 44 is closed when backing down an incline. Note, this second brake light switch 44 is closed at all times except only when the vehicle is in reverse and the back up switch 45 is open at all times except only when the vehicle is in reverse.

It should be understood that the position of the various lamps shown on the FIG. 3 schematic generally represent a plan view of the physical location of the lamps on an actual automotive vehicle.

It will be apparent to those skilled in the art that many modifications and variations may be effected without departing from the spirit and scope of the novel concepts of the present invention.

Referring now specifically to FIG. 5 of the drawings, a schematic circuit is shown utilizing slow starting self contained thermostatic bulbs, which are not suitable for turn signal, lane changing, or hazard lamps, however, are excellent for flashing lamps on both sides of the vehicle when the vehicle is left for a long duration of time, as drain on battery by the bulbs is minute. A separate auxiliary hazard switch 100 is provided for these lamps, shown in FIGS. 1 and 2 as lamps 102a 102b.

What is claimed is:

1. Lane changing lamps for an automotive vehicle, said vehicle having an ignition switch, a directional signal switch, front and rear directional signal lamps on each side thereof and front doors on each side thereof comprising:

left and right vehicle side rear view mirrors having an open housing with a forward and aft surface, said housing protruding from said vehicle on the forward side structure portion of the front vehicle doors on each side thereof within range of the vehicle operator's normal line of vision, each mirror housing having an outer edge surface between forward and aft surfaces with a lane changing lamp set forward of said aft surface on said outer edge surface of said open housing out of the vehicle operator's normal line of vision;

a backup lamp circuit;

a brake lamp circuit;

brake lamps;

a source of electrical energy interconnected through said ignition switch and a bypass flasher element connected to said backup and brake lamp circuits whereby when said brake lamp circuit and said backup lamp circuit are energized said brake lamps flash intermittently;

a directional lamp flasher (22);

a source of electrical energy connected to said directional lamp flasher in series through said ignition switch;

said directional signal switch having a lane changing position interconnecting on a selected side of said vehicle the electrical energy through said ignition switch and directional lamp flasher for selectively flashing said front and rear directional signal lamps and each of the side rear view mirror mounted lane changing lamps.

2. The invention as defined in claim 1 additionally comprising an outer lane changing lamp lens protruding from said outer edge surface of said open housing.

3. The invention as defined in claim 1 wherein said vehicle further includes rear backup lamps and a rear backup lamp circuit for illuminating said backup lamps in a constant state, brake lamps and a brake lamp circuit, said brake lamp circuit and a third flasher associated with the rear backup lamp circuit for illuminating said brake lamps and the mirror mounted lane changing lamps in a flashing state when the backup lamp circuit is activated.

4. The invention as defined in claim 1 wherein said brake lamp circuit further comprises a first and a second brake lamp switch and a backup lamp switch connected to said backup lamp circuit, said first brake lamp switch being closed only when the vehicle is braking and said second brake lamp switch being open only when the vehicle is in reverse.

5. The invention as defined in claim 4 additionally comprising a second brake lamp circuit connected to said back up lamp circuit which operates simultaneously with said back up lamp circuit and disconnects the first mentioned brake lamp circuit for preventing said brake lamps from illuminating in a constant state when said backup circuit is activated thereby maintaining a flashing of said brake lamps when said backup circuit is energized.

* * * * *